(12) United States Patent
Chen et al.

(10) Patent No.: US 9,348,179 B2
(45) Date of Patent: May 24, 2016

(54) LIQUID CRYSTAL DISPLAY DEVICE

(71) Applicant: Innolux Corporation, Miao-Li County (TW)

(72) Inventors: Yi-Hsin Chen, Miao-Li County (TW); Ying-Jen Chen, Miao-Li County (TW); Chih-Yung Hsieh, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 15 days.

(21) Appl. No.: 14/307,525

(22) Filed: Jun. 18, 2014

(65) Prior Publication Data

US 2015/0015829 A1 Jan. 15, 2015

(30) Foreign Application Priority Data

Jul. 10, 2013 (TW) .............................. 102124727 A (51) Int. Cl.
| | |
|---|---|
| *G02F 1/1343* | (2006.01) |
| *G02F 1/1337* | (2006.01) |
| *G02F 1/141* | (2006.01) |
| *G02F 1/1335* | (2006.01) |
| *G02F 1/137* | (2006.01) |

(52) U.S. Cl.
CPC *G02F 1/133707* (2013.01); *G02F 2001/13712* (2013.01); *G02F 2001/133531* (2013.01); *G02F 2001/133757* (2013.01); *G02F 2202/06* (2013.01)

(58) Field of Classification Search
CPC .............. G02F 1/133707; G02F 2001/133531; G02F 2001/133757; G02F 1/13712; G02F 2202/06
USPC ......................................... 349/141, 132, 136
See application file for complete search history.

(56) References Cited

U.S. PATENT DOCUMENTS

| | | | |
|---|---|---|---|
| 6,671,019 B1 * | 12/2003 | Petschek ........... | G02F 1/134336 349/129 |
| 2013/0250216 A1 * | 9/2013 | Chen ................. | G02F 1/134309 349/96 |

* cited by examiner

*Primary Examiner* — Nathanael R Briggs
(74) *Attorney, Agent, or Firm* — McClure, Qualey & Rodack, LLP (57) ABSTRACT

A liquid crystal display device comprises a first substrate, a second substrate, a liquid crystal layer, a first polarizer, a second polarizer and a first electrode layer. The liquid crystal layer is disposed between the first and the second substrates, and comprises a liquid crystal mixture comprising a chiral dopant. The first and the second polarizers are disposed on the first and the second substrates, respectively. The first polarizer has a first absorption axis. The first electrode layer is disposed on one of the first and second substrates, and has a first trunk, a second trunk and a plurality of branches. The first and the second trunks intersect to form at least a first area. A first angle $\theta j$ is formed between the branches and the first trunk, and a second angle $\theta p$ is formed between the first absorption axis and the first trunk.

13 Claims, 9 Drawing Sheets

LIQUID CRYSTAL DISPLAY DEVICE

This application claims the benefit of Taiwan application Serial No. 102124727, filed Jul. 10, 2013, the subject matter of which is incorporated herein by reference.

BACKGROUND OF THE INVENTION

1. Field of the Invention

The present disclosure relates in general to a liquid crystal display device, and more particularly to a liquid crystal display device with an increased overall transmittance.

2. Description of the Related Art

Liquid crystal display (LCD) has been widely used in various electronic products, such as mobile phone, notebook and Tablet PC. As large-sized flat panel displays have been developed rapidly in the market, LCD possessing the features of slimness, lightweight and compactness has gradually replaced the cathode ray tube (CRT) display and becomes a mainstream product in the market.

Currently, vertically aligned LCD has become one of the mainstream products among flat panel displays. Therefore, how to provide a vertically aligned LCD with excellent transmittance has become a prominent task for the industries.

SUMMARY OF THE INVENTION

The present disclosure is directed to a liquid crystal display device. In the embodiments, the transmittance of the overall liquid crystal display device can be improved by adjusting the angle between the branches and the first trunk of the first electrode layer and the angle between the first absorption axis of the first polarizer and the first trunk.

According to one embodiment of the present disclosure, a liquid crystal display device is provided. The liquid crystal display device comprises a first substrate, a second substrate, a liquid crystal layer, a first polarizer, a second polarizer and a first electrode layer. The liquid crystal layer is disposed between the first substrate and the second substrate, and comprises a liquid crystal mixture comprising a chiral dopant. The first polarizer and the second polarizer are disposed on the first substrate and the second substrate, respectively. The first polarizer has a first absorption axis. The first electrode layer is disposed on one of the first substrate and the second substrate. The first electrode layer has a first trunk, a second trunk and a plurality of branches extending from the first trunk and the second trunk. The first trunk and the second trunk intersect to form at least a first area. In the first area, a first angle $\theta j$ is formed between the branches and the first trunk, and a second angle $\theta p$ is formed between the first absorption axis and the first trunk. When the liquid crystal mixture is formed from left-handed liquid crystal molecules, $-5+\theta j+z*90 \leq \theta p \leq 042.5+\theta j+z*90$; when the liquid crystal mixture is formed from right-handed liquid crystal molecules, $-42.5+\theta j+z*90 \leq \theta p \leq 5+\theta j+z*90$, wherein $0 \leq \theta j \leq 90$, and z is an integer.

The above and other aspects of the present disclosure will become better understood with regard to the following detailed description of the preferred but non-limiting embodiment(s). The following description is made with reference to the accompanying drawings.

DETAILED DESCRIPTION OF THE INVENTION

According to the embodiments of the present disclosure, in the liquid crystal display device, the luminance at the junction between the electrode pattern and the edge of the transparent area can be enhanced and the overall transmittance of the liquid crystal display device can be increased through the adjustment in the angle between the branches and the first trunk of the first electrode layer and the angle between the first absorption axis of the first polarizer and the first trunk. A number of embodiments of the present disclosure are described below with accompanying drawings. Common reference numerals are used throughout the drawings and the detailed description to indicate the same elements. It should be noted that the accompanying drawings are simplified for more clearly elaborating the embodiments of the present disclosure, and detailed structures disclosed in the embodiments are for description not for limiting the scope of protection of the invention. Also, anyone who is skilled in the technology field of the invention can make necessary modifications or variations to these structures according to the needs in actual implementations.

Figure 1:
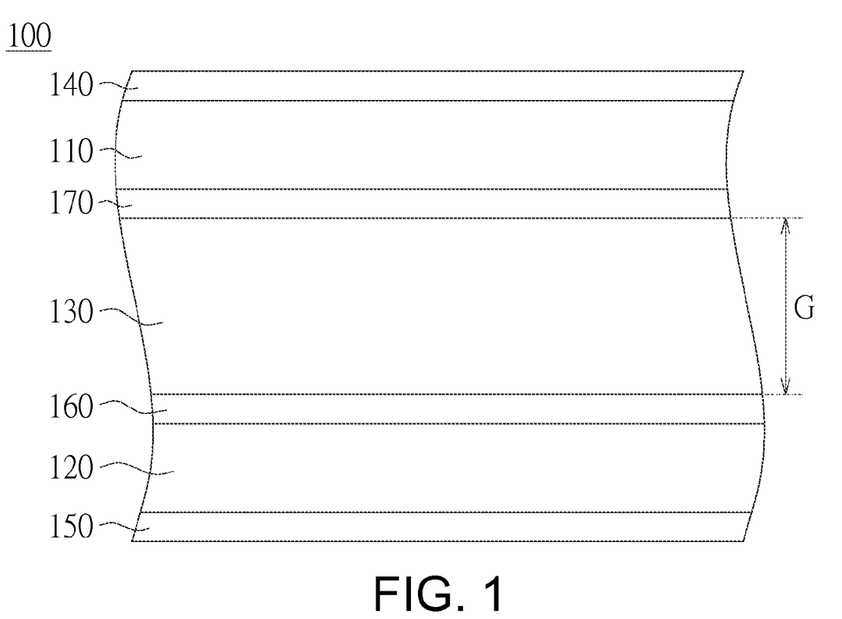
FIG. 1 is a cross-sectional view of a liquid crystal display device according to an embodiment of the present disclosure.
Figure 2:
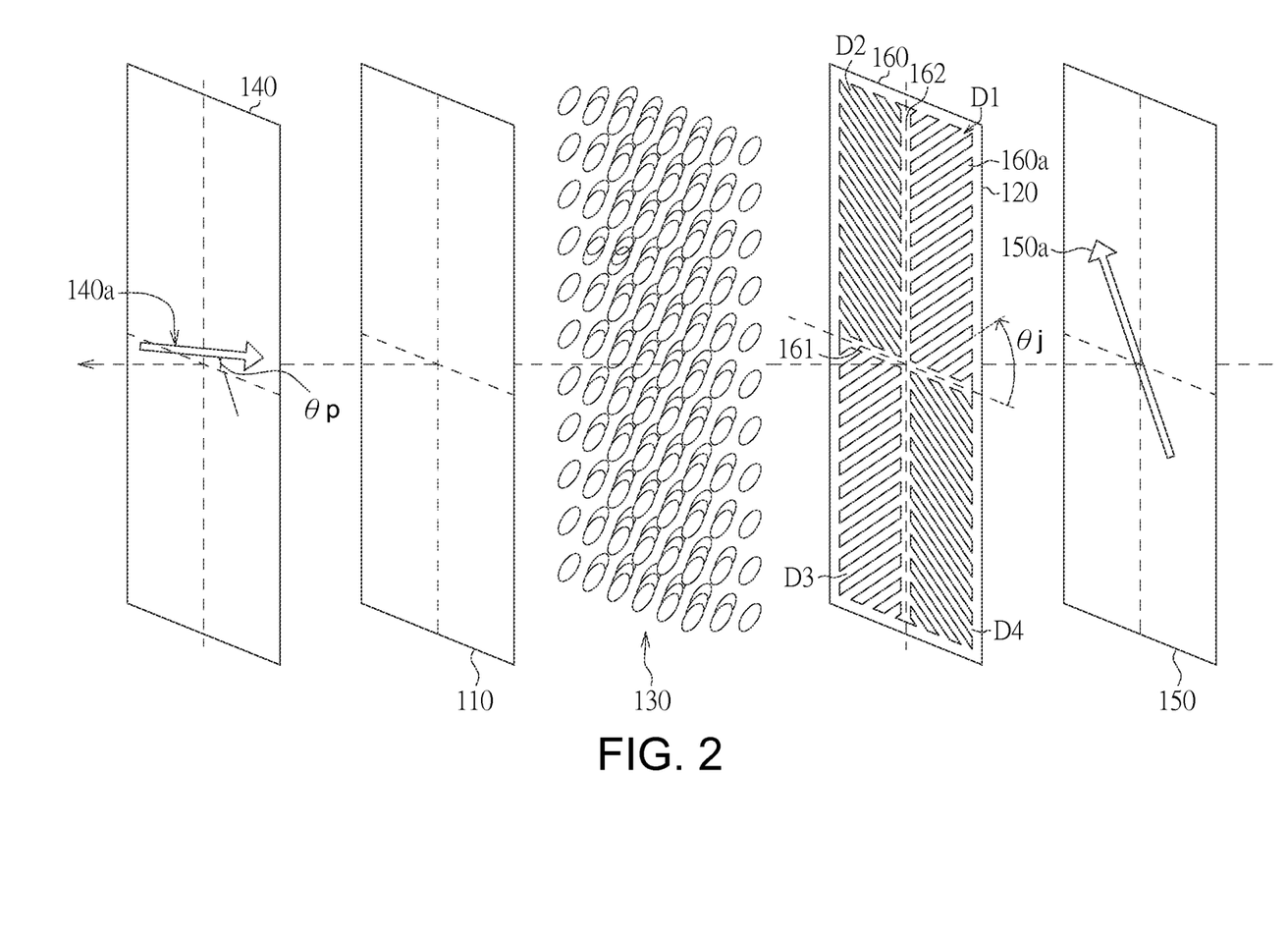
FIG. 2 is a partial explosion diagram of a liquid crystal display device according to an embodiment of the present disclosure.

FIG. 1 is a cross-sectional view of a liquid crystal display device according to an embodiment of the present disclosure. FIG. 2 is a partial explosion diagram of a liquid crystal display device according to an embodiment of the present disclosure. The liquid crystal display device 100 comprises a first substrate 110, a second substrate 120, a liquid crystal layer 130, a first polarizer 140, a second polarizer 150 and a first electrode layer 160. The liquid crystal layer 130 is disposed between the first substrate 110 and the second substrate 120, and comprises a liquid crystal mixture, which comprises a chiral dopant. The chiral dopant is added to the liquid crystal mixture such that the liquid crystal mixture has optical chirality. The first polarizer 140 and the second polarizer 150 are disposed on the first substrate 110 and the second substrate 120, respectively. The first polarizer 140 has a first absorption axis 140a. The first electrode layer 160 is disposed on one of the first substrate 110 and the second substrate 120. As indicated in FIG. 1, in an embodiment, the first electrode layer 160 is disposed on the second substrate 120.

The first electrode layer 160 has a first trunk 161, a second trunk 162 and a plurality of branches 160a extending from the first trunk 161 and the second trunk 162. The first trunk 161 is perpendicular to the second trunk 162. The first trunk 161 and the second trunk 162 intersect to form at least a first area D1. In the first area D1, a first angle $\theta j$ is formed between the branches 160a and the first trunk 161, and a second angle θp is formed between the first absorption axis 140a and the first trunk 161. When the liquid crystal mixture is formed from left-handed liquid crystal molecules, the relationship between the first angle θj and the second angle θp can be expressed as: $-5+\theta j+z*90 \le \theta p \le 42.5+\theta j+z*90$; when the liquid crystal mixture is formed from right-handed liquid crystal molecules, the relationship between the first angle θj and the second angle θp can be expressed as: $-42.5+\theta j+z*90 \le \theta p \le 5+\theta j+z*90$; wherein $0 \le \theta j \le 90$, and z is an integer. Thus, the transmittance of the liquid crystal display device 100 can reach 75% or even above, providing uniform luminance.

Here, 'left-handed' and 'right-handed' denote the optical chirality of the liquid crystal mixture. That is, in the liquid crystal mixture having optical chirality, the orientation of the liquid crystal molecules (the director axis) is spontaneously perpendicular to the spiral axis and change periodically to form a liquid crystal mixture with spiral structure. 'Pitch' refers to the required distance for the director axis of liquid crystal molecules to rotate around the spiral axis for 360°. When the observing direction is parallel to the spiral axis, the liquid crystal molecules are referred as 'left-handed' liquid crystal molecules if their director axes are arranged in a clockwise manner from the distant to the near, and are referred as 'right-handed' liquid crystal molecules if their director axes are arranged in an anti-clockwise manner.

In an embodiment, when the liquid crystal mixture is formed from left-handed liquid crystal molecules, the relationship between the first angle θj and the second angle θp can be expressed as: $15+\theta j+z*90 \le \theta p \le 30+\theta j+z*90$; when the liquid crystal mixture is formed from right-handed liquid crystal molecules, the relationship between the first angle θj and the second angle θp can be expressed as: $-30+\theta j+z*90 \le \theta p \le -15+\theta j+z*90$, wherein $0 \le \theta j \le 90$, and z is an integer. Thus, the transmittance of the liquid crystal display device 100 can reach 85% or above.

In the embodiment, the first trunk 161 and the second trunk 162 intersect to form a plurality of areas. In the embodiment, as indicated in FIG. 2, the areas include the first area D1, a second area D2, a third area D3 and a fourth area D4, and the branches 160a in any two adjacent areas of the areas D1-D4 are substantially perpendicular to each other. That is, the angle between the branches 160a in any two different adjacent areas of the areas D1-D4 is between 85~95°. For instance, the first area D1 is adjacent to the third area D3, and the branches 160a in the first area D1 are substantially perpendicular to the branches 160a in the third area D3.

However, the first trunk 161 and the second trunk 162 can intersect to form more than four areas. For instance, many first trunk 161 and one second trunk may form eight or more than eight areas (not illustrated), in which every four areas form a repeating unit. Basically, the number of the areas formed by intersecting the first trunk 161 and the second trunk 162 is a multiple of 4.

In the embodiment, the branches 160a in the same area are substantially parallel to each other. For instance, the branches 160a in the first area D1 are substantially parallel to each other.

As indicated in FIG. 1, in the embodiment, the first substrate 110 and the second substrate 120 are separated by a cell gap G, which is the thickness of the liquid crystal layer 130. The liquid crystal mixture has optical chirality, the left-handed or right-handed liquid crystal mixture has a pitch, and the ratio of the pitch to the cell gap G is such as 0.2-0.3. The liquid crystal layer 130 has a phase retardation of such as 400 nm-550 nm.

In the embodiment, the liquid crystal mixture is such as a negative liquid crystal mixture, and the liquid crystal display device 100 is such as a vertically aligned (VA) liquid crystal display device. According to the embodiments of the invention, the liquid crystal mixture having optical chirality is used in the liquid crystal layer 130; as such, the transmittance of the light corresponding to some local areas of the pixel electrode can be increased.

In the embodiment, the liquid crystal mixture may further comprise a polymer, so that photo-induced alignment can be performed on the liquid crystal mixture.

In the embodiment, as indicated in FIG. 1, the second polarizer 150 has a second absorption axis 150a perpendicular to the first absorption axis 140a of the first polarizer 140.

As indicated in FIG. 1, in the embodiment, the liquid crystal display device 100 further comprises a second electrode layer 170 disposed on the other one of the first substrate 110 and the second substrate 120, that is, on the substrate not having the first electrode layer 160 disposed thereon. As indicated in FIG. 1, in the embodiment, the second electrode layer 170 is disposed on the first substrate 110. In an embodiment, the second electrode layer 170 is such as a full flat layer without any trunks or branches.

Figure 3A:
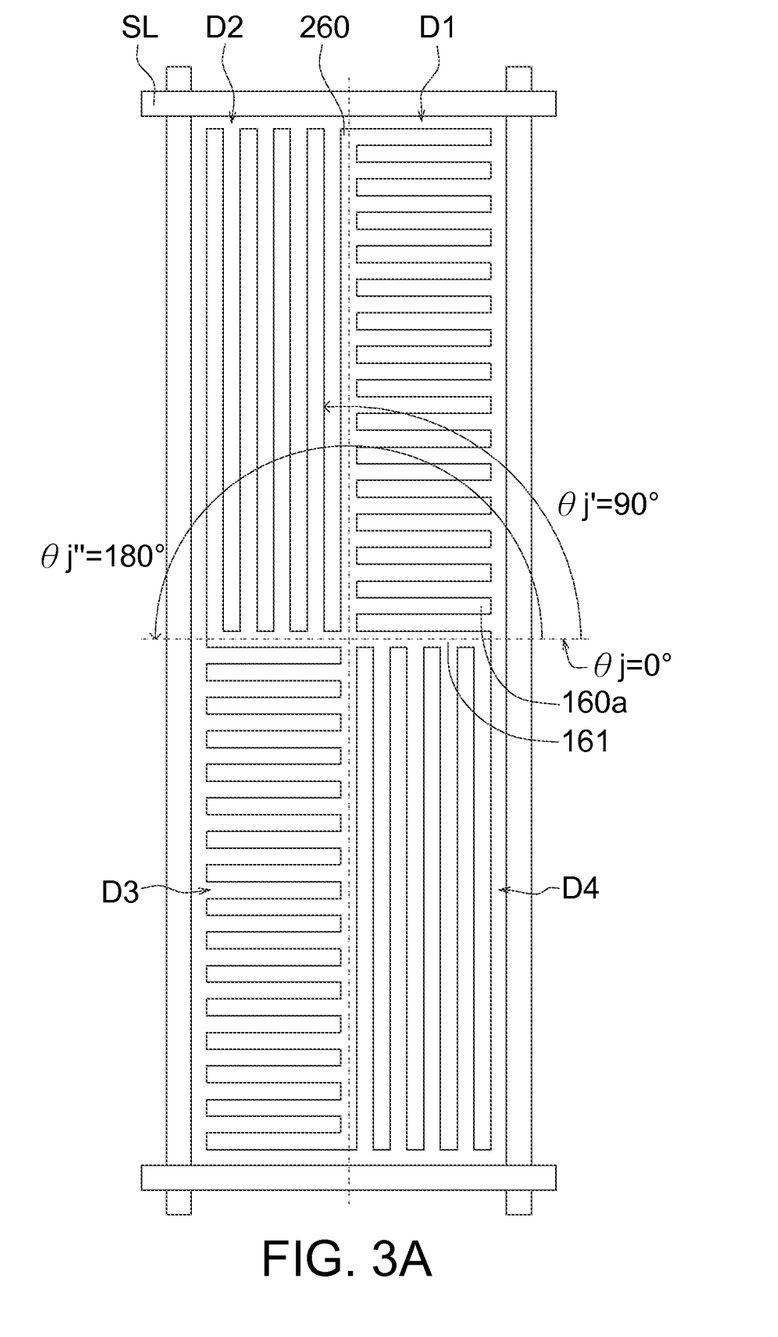
FIGS. 3A-3E are top views of a first electrode layer of a liquid crystal display device according to an embodiment of the present disclosure.
Figure 3B:
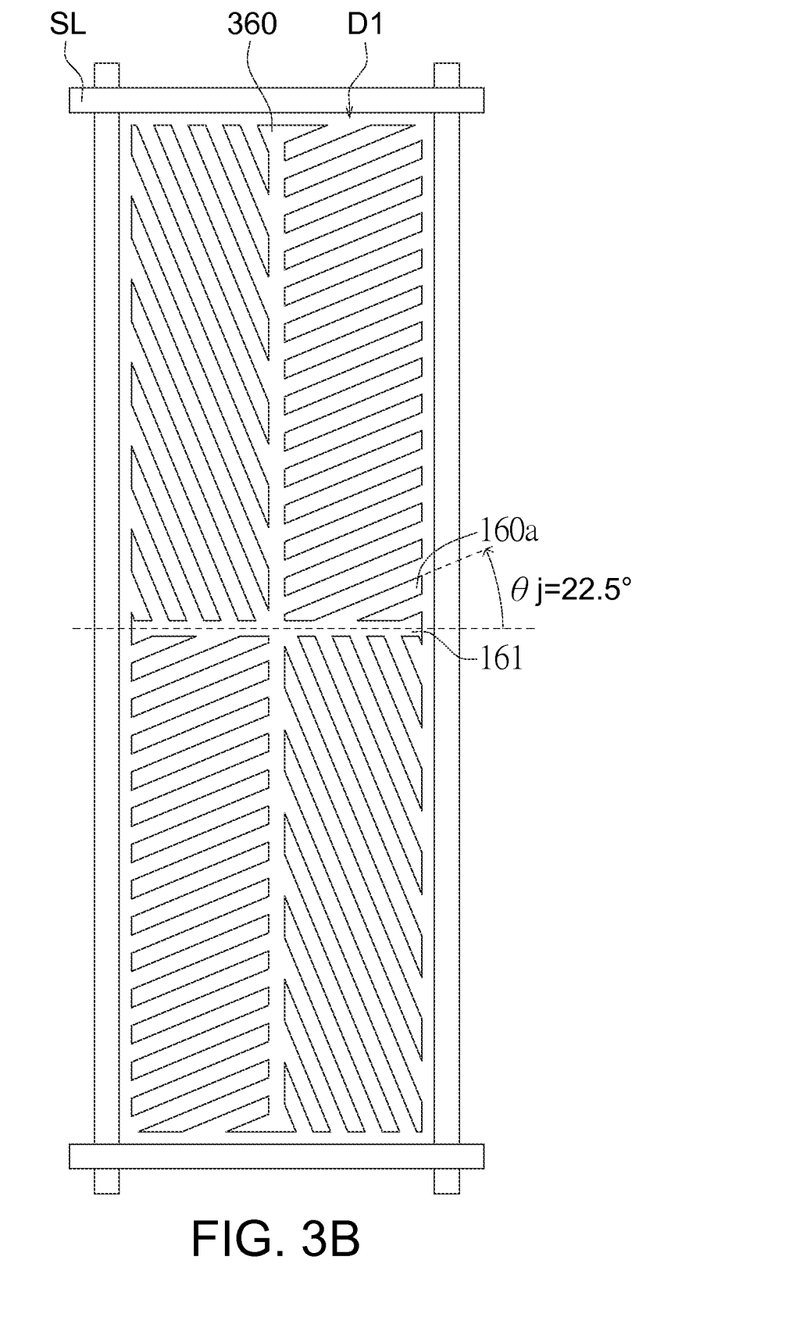
Figure 3C:
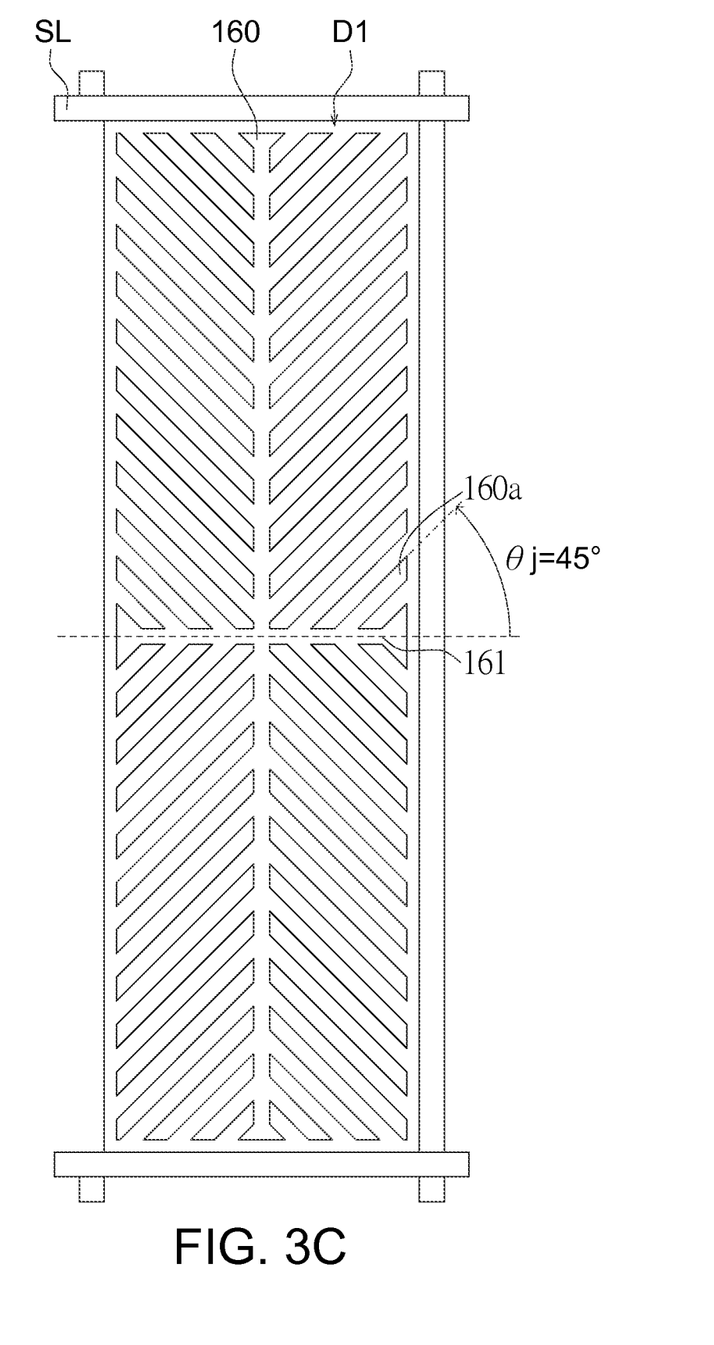
Figure 3D:
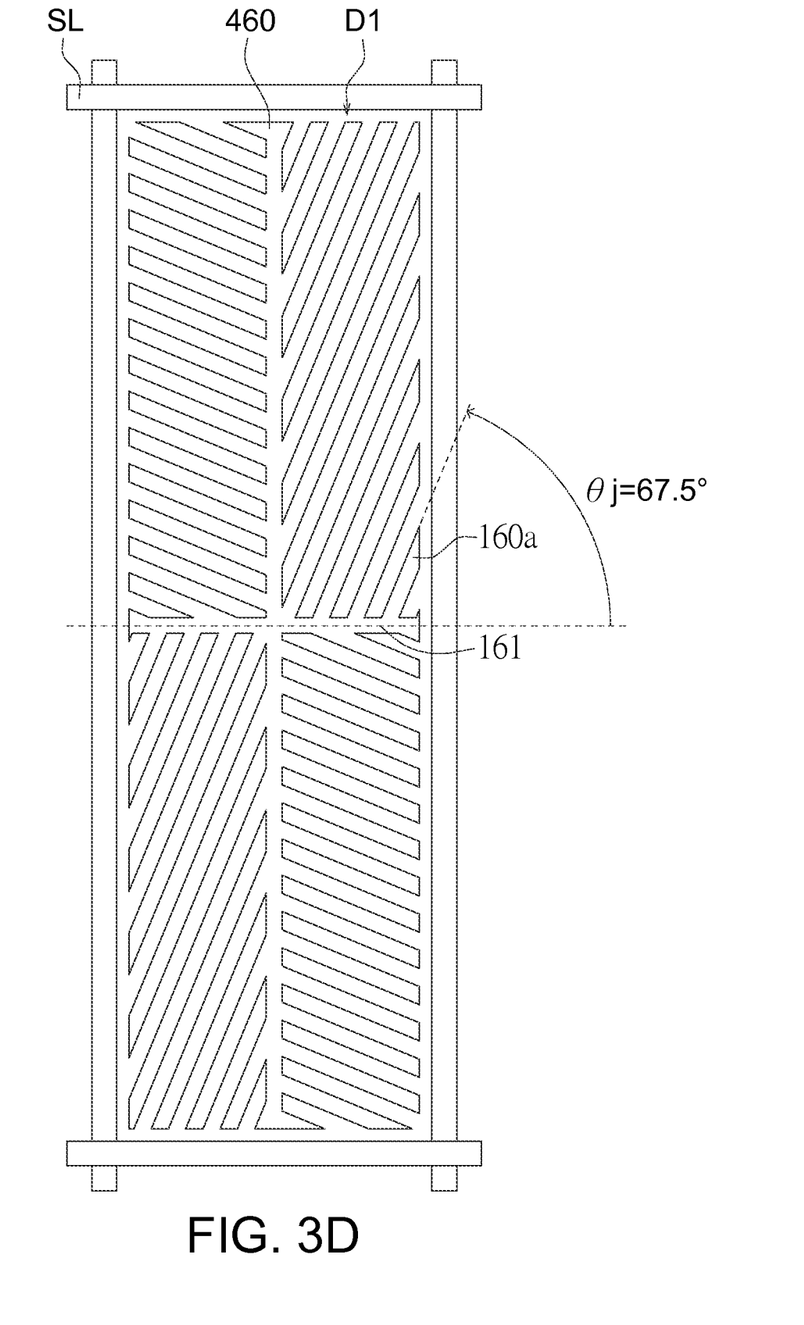
Figure 3E:
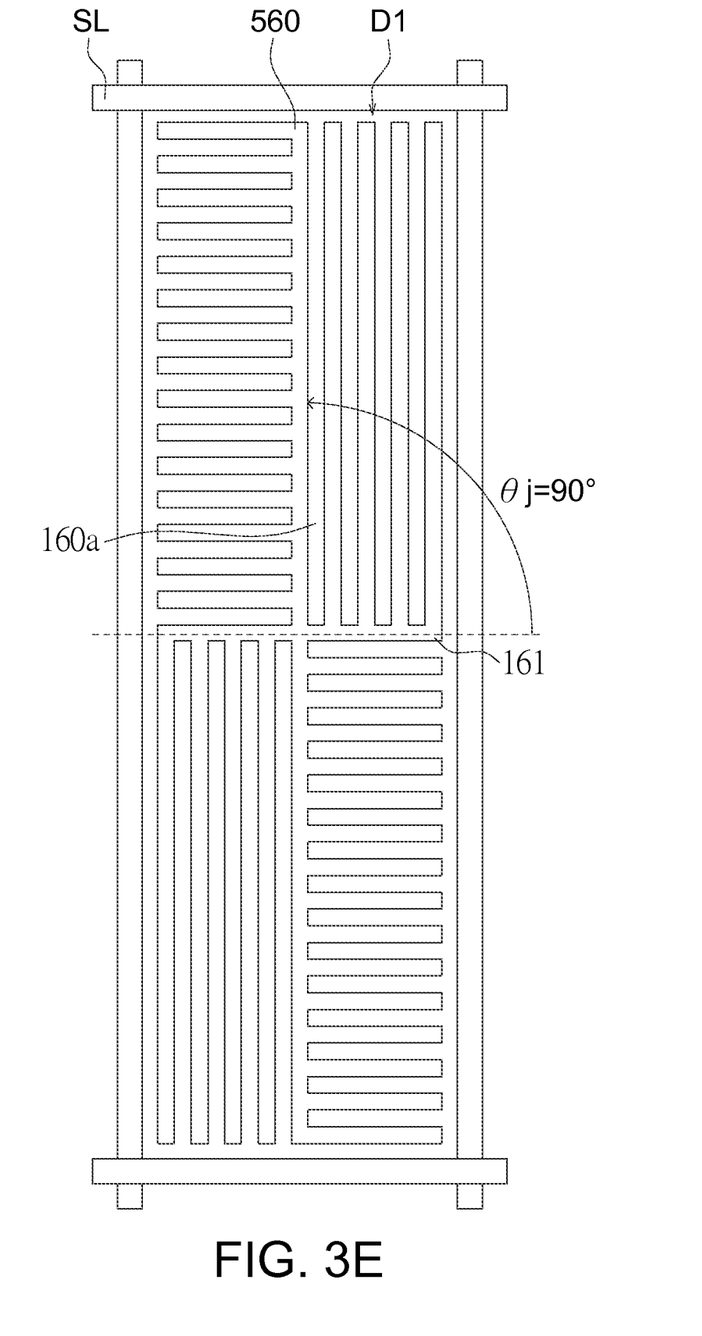

FIGS. 3A-3E are top views of a first electrode layer of a liquid crystal display device according to an embodiment of the present disclosure. As indicated in FIG. 3A, in the first area D1, the first angle θj formed between the branches 160a and the first trunk 161 of the first electrode layer 260 is 0°. As indicated in FIG. 3B, in the first area D1, the first angle θj formed between the branches 160a and the first trunk 161 of the first electrode layer 360 is 22.5°. As indicated in FIG. 3C, in the first area D1, the first angle θj formed between the branches 160a and the first trunk 161 of the first electrode layer 160 is 45°. As indicated in FIG. 3D, in the first area D1, the first angle θj formed between the branches 160a and the first trunk 161 of the first electrode layer 460 is 67.5°. As indicated in FIG. 3E, in the first area D1, the first angle θj formed between the branches 160a and the first trunk 161 of the first electrode layer 560 is 90°.

As indicated in FIG. 3A, in the second area D2, the first angle θj' formed between the branches 160a and the first trunk 161 of the first electrode layer 260 is 90°. In the third area D3, the first angle θj" formed between the branches 160a and the first trunk 161 of the first electrode layer 260 is 180°. By the same analogy, the first angles θj formed between the branches 160a and the first trunk 161 in different areas differs from each other by a multiple of 90°. In other words, the angle between the branches 160a in any two adjacent areas D1-D4 is about 90°, such as about 85-95°.

In an embodiment, as indicated in FIGS. 3A-3E, the first trunk 161 is substantially parallel to the scan line SL.

The liquid crystal mixture having optical chirality is used in the liquid crystal layer 130; accordingly, the transmittance of the light in some areas is increased. However, with the same design of the pixel electrode, the director axis of liquid crystal molecules having optical chirality is biased by an angle in comparison to the director axis of liquid crystal molecules having no optical chirality, regardless the liquid crystal molecules being left-handed or right-handed. If the angle of the polarizer is not adjusted, the overall transmittance cannot be optimized.

Figure 4:
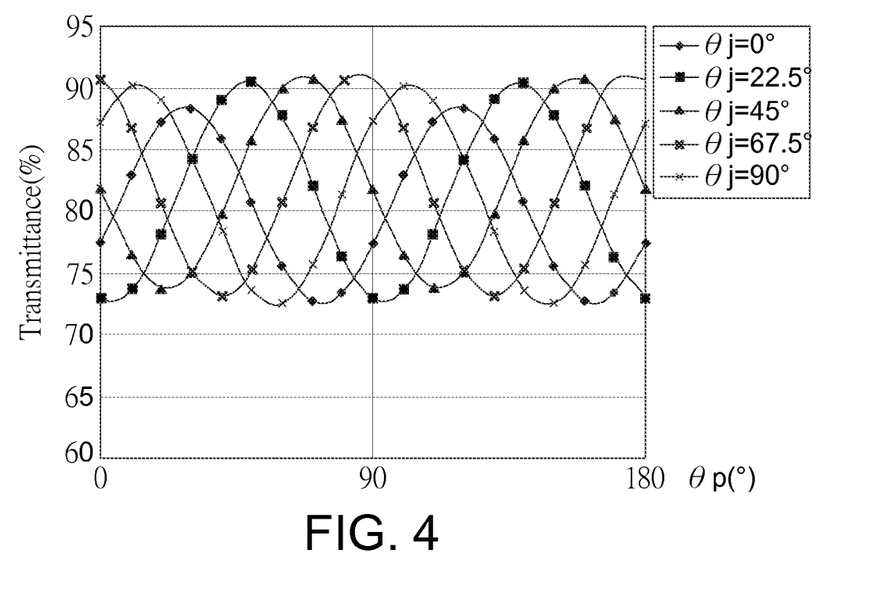
FIG. 4 shows simulation results of the relationship between transmittance, the first angle $\theta j$ and the second angle $\theta p$ of the liquid crystal display device according to an embodiment of the present disclosure.

FIG. 4 shows simulation results of the relationship between transmittance, the first angle θj and the second angle θp of the liquid crystal display device according to an embodiment of the present disclosure. In the present embodiment, the calculation of simulation is based on left-handed liquid crystal molecules. The five curves in FIG. 4 respectively correspond to the simulation results of the electrode designs of FIGS. 3A-3E. As indicated in FIG. 4, when the first angle θj formed between the branches 160a and the first trunk 161 of the first electrode layer changes, the maximum transmittance corresponds to different second angle θp formed between the first absorption axis 140a and the first trunk 161 of the first polarizer 140. When the second angle θp is within the range of 0≤θp≤90, no matter how the first angle θj changes, the maximum and minimum of transmittance will occur once. In other words, no matter how the first angle θj changes, the maximum and minimum of transmittance vary along with the second angle θp and will appear repeatedly by every 90°.

Figure 5:
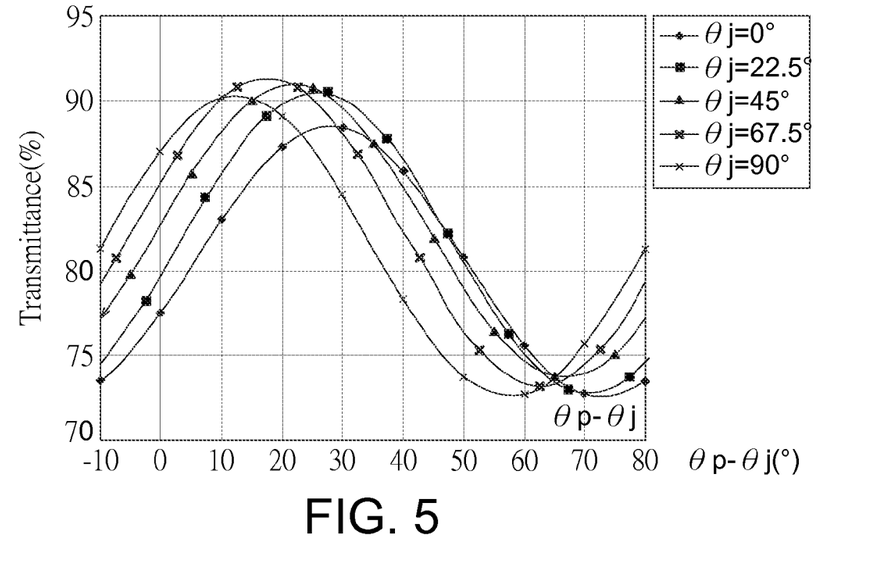
FIG. 5 shows simulation results of the relationship between transmittance and the difference ($\theta p - \theta j$) between the first angle $\theta j$ and the second angle $\theta p$ of the liquid crystal display device according to an embodiment of the present disclosure.

FIG. 5 shows simulation results of the relationship between transmittance and the difference (θp−θj) between the first angle θj and the second angle θp of the liquid crystal display device according to an embodiment of the present disclosure. In the present embodiment, the calculation of simulation is based on left-handed liquid crystal molecules. The data adopted in FIG. 5 are the same with that of FIG. 4. To more clearly represent the first angle θj, the relationship between the second angle θp and the transmittance is represented in a different way in FIG. 5.

For instance, when the angle between the absorption axis of the polarizer and the branches of the electrode layer is 45°, and the liquid crystal layer is formed from the liquid crystal molecules without optical chirality, the branches of the electrode layer guide the orientation of the director axis of the liquid crystal molecules, so that the angle of the director axis of the liquid crystal molecules is not biased. However, as indicated in FIG. 5, when the angle between the absorption axis of the polarizer and the branches of the electrode layer is 45° (that is, the value of the difference (θp−θj) between the first angle and the second angle), due to the bias in the angle of the director axis of the left-handed liquid crystal molecules, the transmittance of the display device could be below 75%. For instance, as indicated in FIG. 5, when the difference (θp−θj) between the first angle and the second angle is not within the range of −5-42.5, the transmittance of the display device is below 75%. On the contrary, according to the embodiments of the present disclosure, as indicated in FIG. 5, when the difference (θp−θj) is −5-42.5, the transmittance of the display device can reach 75% or above. Furthermore, when the difference (θp−θj) is 15-30, the transmittance can reach 85% or above.

In other words, when the liquid crystal mixture is formed from left-handed liquid crystal molecules, the relationship between the first angle θj and the second angle θp can be represented as: −5+θj≤θp≤42.5+θj. After considering the fact that the maximum and minimum of transmittance appear repeatedly every 90° as indicated in FIG. 4, the relationship between the first angle θj and the second angle θp can be further represented as: −5+θj+z*90≤θp≤42.5+θj+z*90, wherein 0≤θj≤90, and z is an integer.

Figure 6:
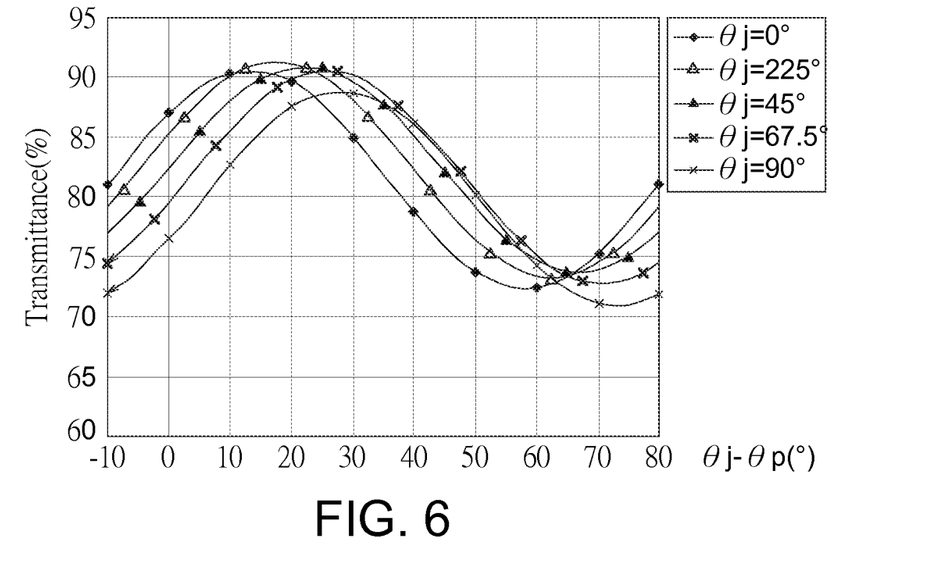
FIG. 6 shows simulation results of the relationship between transmittance and the difference ($\theta p - \theta j$) between the first angle $\theta j$ and the second angle $\theta p$ of the liquid crystal display device according to another embodiment of the present disclosure.

FIG. 6 shows simulation results of the relationship between transmittance and the difference (θp−θj) between the first angle θj and the second angle θp of the liquid crystal display device according to another embodiment of the present disclosure. In the present embodiment, the calculation of simulation is based on right-handed liquid crystal molecules. As indicated in FIG. 6, when the difference (θj−θp) is −5-42.5, the transmittance can reach 75% or above. Furthermore, when the difference (θp−θj) is 15-30, the transmittance can reach 85% or above.

Similarly, when the liquid crystal mixture is formed from right-handed liquid crystal molecules, the relationship between the first angle θj and the second angle θp can be represented as: −42.5+θj≤θp≤5+θj. After considering the fact that the maximum and minimum of transmittance appear repeatedly every 90°, the relationship between the first angle θj and the second angle θp can be further represented as: −42.5+θj+z*90≤θp≤5+θj+z*90; wherein 0≤θj≤90, and z is an integer.

As the liquid crystal mixture having optical chirality is used in the liquid crystal layer 130, the phase retardation in local sections of the electrode pattern can be increased to further increase the transmittance of the light for some areas of the pixel electrode. According to the embodiments of the invention, the influence caused by the bias in the angle of the director axis of liquid crystal molecules can be eliminated by adjusting the relationship between the first angle θj and the second angle θp, not only increasing the luminance in local sections of the electrode pattern but also increasing the overall transmittance of the liquid crystal display device.

In the embodiments, the method of adjusting the relationship between the first angle θj and the second angle θp is non-limiting. For instance, the adjustment in the relationship between the first angle θj and the second angle θp can be achieved by adjusting the first angle θj between the branches 160a and the first trunk 161 of the first electrode layer or by adjusting the second angle θp between the first absorption axis 140a of the first polarizer 140 and the first trunk 161. Any adjustment methods would do as long as the following conditions are satisfied: When the liquid crystal mixture is formed from left-handed liquid crystal molecules, the relationship between the first angle θj and the second angle θp can be expressed as: −5+θj+z*90≤θp≤42.5+θj+z*90; when the liquid crystal mixture is formed from right-handed liquid crystal molecules, the relationship between the first angle θj and the second angle θp can be expressed as: −42.5+θj+z*90≤θp≤5+θj+z*90; wherein 0≤θj≤90, and z is an integer.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display device, comprising:
   a first substrate and a second substrate;
   a liquid crystal layer disposed between the first substrate and the second substrate, wherein the liquid crystal layer comprises a liquid crystal mixture, the liquid crystal mixture comprises a chiral dopant, and the liquid crystal mixture is formed from left-handed liquid crystal molecules;
   a first polarizer and a second polarizer disposed on the first substrate and the second substrate, respectively, wherein the first polarizer has a first absorption axis; and
   a first electrode layer disposed on one of the first substrate and the second substrate, wherein the first electrode layer has a first trunk, a second trunk and a plurality of branches extending from the first trunk and the second trunk, and the first trunk and the second trunk intersect to form at least a first area;
   wherein, in the first area, a first angle 8j is formed between the branches and the first trunk, a second angle 8p is formed between the first absorption axis and the first trunk, and the first angle and the second angle satisfy the equation of −5+θj≤θp≤42.5+θj and 0≤θj≤90.

2. The liquid crystal display device according to claim 1, wherein the first angle and the second angle further satisfy the equation of 15+θj≤θp≤30+θj.

3. The liquid crystal display device according to claim 1, wherein the first trunk and the second trunk intersect to form a plurality of areas comprising the first area, and the branches in any two adjacent areas are substantially perpendicular to each other.

4. The liquid crystal display device according to claim 1, wherein the branches in the first area are substantially parallel to each other.

5. The liquid crystal display device according to claim 1, wherein the liquid crystal mixture has a pitch, the first substrate and the second substrate are separated by a cell gap, and a ratio of the pitch to the cell gap is 0.2-0.3.

6. The liquid crystal display device according to claim 1, wherein the liquid crystal layer has a phase retardation of 400-550 nm.

7. The liquid crystal display device according to claim 1, further comprising a second electrode layer disposed on the other one of the first substrate or the second substrate.

8. The liquid crystal display device according to claim 7, wherein the second electrode layer is full flat.

9. The liquid crystal display device according to claim 1, wherein the second polarizer has a second absorption axis substantially perpendicular to the first absorption axis of the first polarizer.

10. The liquid crystal display device according to claim 1, wherein the liquid crystal mixture is a negative liquid crystal mixture.

11. The liquid crystal display device according to claim 1, wherein the liquid crystal mixture further comprises a polymer for performing photo-induced alignment on the liquid crystal mixture.

12. A liquid crystal display device, comprising:
a first substrate and a second substrate;
a liquid crystal layer disposed between the first substrate and the second substrate, wherein the liquid crystal layer comprises a liquid crystal mixture, the liquid crystal mixture comprises a chiral dopant, and the liquid crystal mixture is formed from right-handed liquid crystal molecules;
a first polarizer and a second polarizer disposed on the first substrate and the second substrate, respectively, wherein the first polarizer has a first absorption axis; and
a first electrode layer disposed on one of the first substrate and the second substrate, wherein the first electrode layer has a first trunk, a second trunk and a plurality of branches extending from the first trunk and the second trunk, and the first trunk and the second trunk intersect to form at least a first area;
wherein, in the first area, a first angle $\theta j$ is formed between the branches and the first trunk, a second angle $\theta p$ is formed between the first absorption axis and the first trunk, and the first angle and the second angle satisfy the equation of $-42.5+\theta j \le \theta p \le 5+\theta j$ and $0 \le \theta j \le 90$.

13. The liquid crystal display device according to claim 12, wherein the first angle and the second angle further satisfy the equation of $-30+\theta j \le \theta p \le -15+\theta j$.

* * * * *